(12) United States Patent
Vincent et al.

(10) Patent No.: US 11,258,841 B2
(45) Date of Patent: *Feb. 22, 2022

(54) METHOD FOR THE TRANSMISSION OF AUDIO CONTENTS IN A HYBRID RECEIVER, SYSTEM, RECEIVER AND PROGRAM ASSOCIATED WITH THE METHOD

(71) Applicant: TDF, Montrouge (FR)

(72) Inventors: David Vincent, Amanlis (FR); Dimitri Fague, Paris (FR); Francois Lebrat, Paris (FR)

(73) Assignee: TDF, Montrouge (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/627,112

(22) PCT Filed: Jun. 27, 2018

(86) PCT No.: PCT/EP2018/067232
§ 371 (c)(1),
(2) Date: Dec. 27, 2019

(87) PCT Pub. No.: WO2019/002359
PCT Pub. Date: Jan. 3, 2019

(65) Prior Publication Data
US 2020/0162536 A1 May 21, 2020

(30) Foreign Application Priority Data
Jun. 28, 2017 (FR) ...................................... 1755973

(51) Int. Cl.
H04L 12/24 (2006.01)
H04L 41/0803 (2022.01)
(Continued)

(52) U.S. Cl.
CPC .............. *H04L 65/80* (2013.01); *G06F 3/165* (2013.01); *H04L 12/1881* (2013.01); *H04L 65/4076* (2013.01); *H04L 67/42* (2013.01)

(58) Field of Classification Search
CPC . H04L 65/80; H04L 12/1881; H04L 65/4076; H04L 67/42; H04L 69/40; H04L 65/4092; H04L 67/145; G06F 3/165
(Continued)

(56) References Cited

U.S. PATENT DOCUMENTS 7,522,167 B1 * 4/2009 Diard .................... G06T 15/005
345/502
10,897,652 B1 1/2021 Atkins et al.
(Continued)

FOREIGN PATENT DOCUMENTS

AU 2014274511 A1 1/2015
CN 101563941 A 10/2009
(Continued)

OTHER PUBLICATIONS

English translation of the Written Opinion of the International Searching Authority dated Sep. 25, 2018 for corresponding International Application No. PCT/EP2018/067232, filed Jun. 27, 2018.
(Continued)

*Primary Examiner* — Moustafa M Meky
*Assistant Examiner* — Elizabeth Kassa
(74) *Attorney, Agent, or Firm* — David D. Brush; Westman, Champlin & Koehler, P.A.

(57) ABSTRACT

A method of transmitting an audio and/or audiovisual content to a receiver. The method starts with receiving a determined stream broadcast on a network and playing back the contents transmitted by the stream in the receiver. Then a first event external to the receiver is detected and triggers interruption of the playback of the content in progress and
(Continued)

Figure 1:
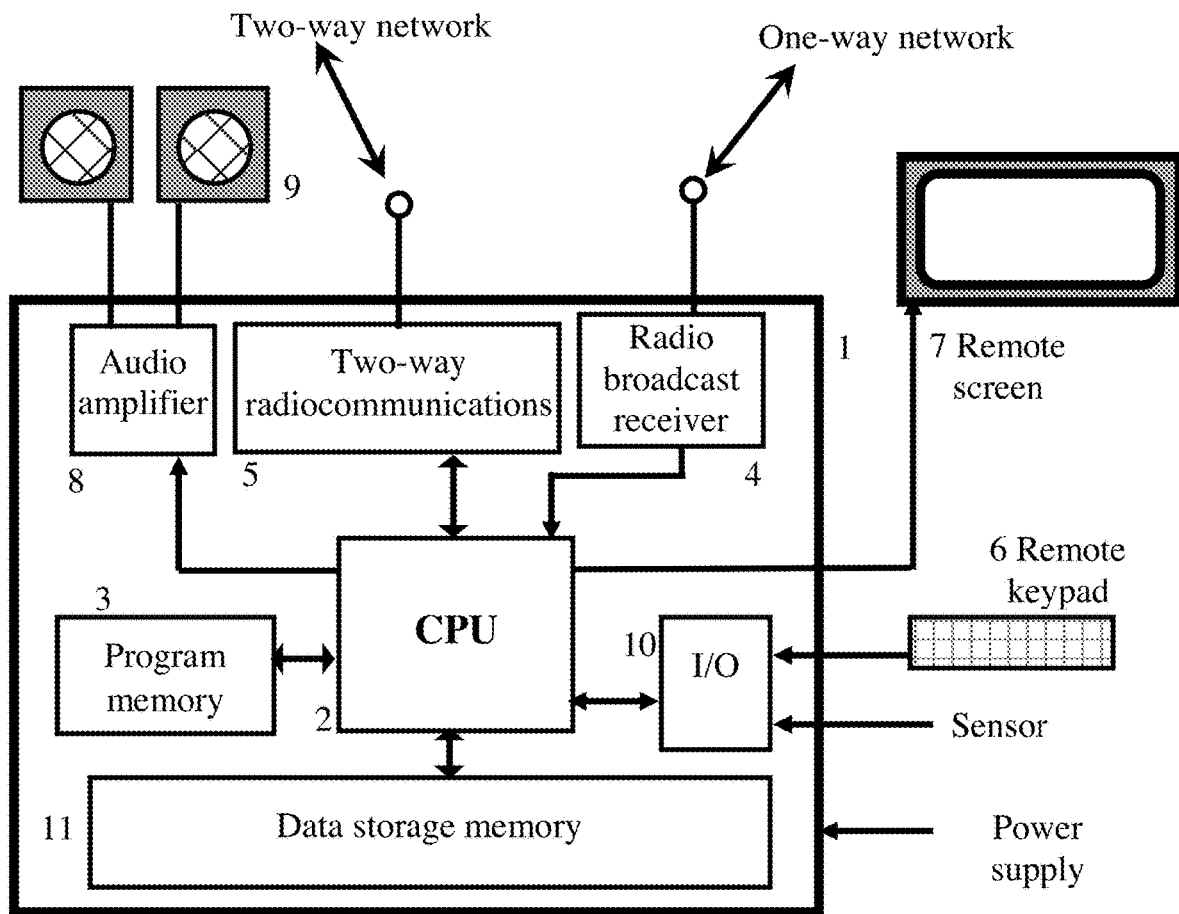

recording of the instant of the interruption. Sometime later, a second external event triggers a transmission, from the receiver to a remote server, of the instant dating the first event and of a request for resuming the playback of the interrupted content. A piece of information specifying the identifiers of the data packets of the content at the instant of the interruption is then transmitted from the remote server to the receiver. Finally, the receiver receives the identified data packets and replays the content of the packets.

14 Claims, 5 Drawing Sheets

(51) Int. Cl.
*H04L 65/80* (2022.01)
*G06F 3/16* (2006.01)
*H04L 12/18* (2006.01)
*H04L 65/611* (2022.01)
*H04L 67/01* (2022.01)

(58) Field of Classification Search
USPC ........................................................ 709/219
See application file for complete search history.

(56) References Cited

U.S. PATENT DOCUMENTS

| | | | |
|---|---|---|---|
| 2003/0158741 A1 | 8/2003 | Nakano | |
| 2008/0162666 A1 | 7/2008 | Ebihara et al. | |
| 2008/0248832 A1 | 10/2008 | Kim et al. | |
| 2009/0241149 A1 | 9/2009 | Yoshioka et al. | |
| 2010/0060801 A1 | 3/2010 | Kimura | |
| 2010/0112935 A1 | 5/2010 | Minter et al. | |
| 2010/0167809 A1* | 7/2010 | Perlman | A63F 13/358 463/24 |
| 2014/0373077 A1 | 12/2014 | Rumreich | |
| 2016/0182192 A1* | 6/2016 | Milbar | H04L 1/16 714/748 |
| 2017/0171586 A1* | 6/2017 | Sartori | H04N 21/4147 |
| 2018/0091567 A1* | 3/2018 | Bekiares | H04L 65/4069 |
| 2018/0376105 A1* | 12/2018 | Davies | G06F 3/04842 |
| 2019/0020923 A1 | 1/2019 | Joye et al. | |

FOREIGN PATENT DOCUMENTS

| | | |
|---|---|---|
| CN | 104301794 A | 1/2015 |
| JP | 2003111004 A | 4/2003 |

OTHER PUBLICATIONS

English translation of the Written Opinion of the International Searching Authority dated Sep. 25, 2018 for corresponding International Application No. PCT/EP2018/067225, filed Jun. 27, 2018.

International Search Report dated Sep. 13, 2018 for corresponding International Application No. PCT/EP2018/067225, filed Jun. 27, 2018.

Written Opinion of the International Searching Authority dated Sep. 13, 2018 for corresponding International Application No. PCT/EP2018/067225, filed Jun. 27, 2018.

International Search Report dated Aug. 16, 2018 for corresponding International Application No. PCT/EP2018/067232, filed Jun. 27, 2018.

Written Opinion of the International Searching Authority dated Aug. 16, 2018 for corresponding International Application No. PCT/EP2018/067232, filed Jun. 27, 2018.

Office Action dated May 27, 2021 for U.S. Appl. No. 16/627,109, filed Dec. 27, 2019.

Search Report for Chinese Patent Application No. 2018800441710 dated Jul. 26, 2021.

English machine translation of Notification according to Article 94(3) of the parallel European Application No. 18 732 379.5 dated Mar. 30, 2021.

Final Office Action dated Nov. 23, 2021 for U.S. Appl. No. 16/627,109, filed Dec. 27, 2019.

Second Office Action for related Chinese Patent Application No. 201880043710.9 dated Oct. 29, 2021.

* cited by examiner

METHOD FOR THE TRANSMISSION OF AUDIO CONTENTS IN A HYBRID RECEIVER, SYSTEM, RECEIVER AND PROGRAM ASSOCIATED WITH THE METHOD

CROSS-REFERENCE TO RELATED APPLICATIONS

This Application is a Section 371 National Stage Application of International Application No. PCT/EP2018/067232, filed Jun. 27, 2018, which is incorporated by reference in its entirety and published as WO 2019/002359 A1 on Jan. 3, 2019, not in English.

1. FIELD OF THE INVENTION

The field of the invention is that of the reception of an audio or audiovisual content in a hybrid receiver capable of receiving contents from both a broadcasting network and a two-way network. The invention more particularly concerns the fact that the playback of contents is interrupted and that the part remaining to be played back is then downloaded from a network.

2. TECHNOLOGICAL BACKGROUND

In the field of the broadcasting of audio or audiovisual contents, there are known receivers called "hybrid" receivers capable of receiving and playing back equally well broadcasts coming from a broadcasting network, contents transmitted from a site, and contents transmitted in "podcast" mode. These receivers are provided with a user interface comprising a screen and a keypad, radio reception means and means for sending sound signals to speakers. The user sets his device to receive a content that is broadcast by radio or comes from an Internet site. Certain hybrid devices can expand the reception of broadcast audio contents with an Internet or "IP" type connection, for example by improving the coverage zone for the broadcast contents by combining their conventional reception through broadcasting networks according to the following broadcasting standards (the list is not exhaustive):

FM (frequency modulation) or AM (amplitude modulation),
DAB (Digital Audio Broadcasting»), DAB+,
DMB,
DRM, DRM+,
DVB (Digital Video Broadcasting»), DVB-T, DVB-S,
Etc/with downloading or streaming by IP (Wi-Fi, 3G, 4G) networks.

If the digital documents are of the audio and/or video type, then they are generally encoded according to the MPEG standard, and then a server receives them from one or more sources and schedules the broadcasting of the documents in the form of a succession of digital data packets (or chunks: this term will be used here below in the rest of the document). The techniques of segmentation are known per se. We can cite for example the HLS, DASH algorithms or again the Smooth Streaming algorithm. Each chunk has a file data structure containing a payload (for example audio and/or video data, with the data synchronizing their playback, for example timestamps), a reference, and a source identifier (typically the identifier of a broadcasting channel). The broadcasting of the digital documents can be done by digital television broadcasting networks such as TNT networks implementing the DVB-T2 (Digital Video Broadcasting-Terrestrial) standard. The broadcasting of data packets is specified by standards enabling the broadcasts to be received by a large number of receivers of all types.

At any time, an event can take place forcing the user to interrupt the playback on his receiver. This event can for example be the fact that the receiver is an embedded auto-radio embedded in a vehicle and that, at certain places, the device exits a coverage zone and is unable to receive the content being played back. The event can also be the fact that the user receives a phone call that will use the same audio system as the one currently playing back the audio content. In another context, the user leaves his home and asks his system to interrupt the playback until he returns. One of the goals of the present invention is the possibility of resuming the playback of the content at the instant when it was interrupted.

To this end, one simple way to continue the playback of an interrupted content is to continue to receive it and to record it in a memory of the playback device. During the resumption, the device reads in its circularly organized memory and plays back the content in a time-shifted mode. This system requires a local memory of sufficient size and, in any case, is not suited for events that prevent the accurate reception of the content. Another way to continue the playback of a content consists in getting connected to a site that enables the downloading of the remaining part. The device downloads and records the full content and, in using a user interface, the user can fast forward and thus go beyond those passages that the user has already listened to. This operation, which makes it possible to retrieve parts of broadcast contents that have not been played, is fairly cumbersome because the user must himself identify the content that he wishes to download.

The teaching of the document AU 2014 274 511, published on 15 Jan. 2015, relates to a receiver of television by internet provided with means to receive an audio visual content, stop its playback and then receive the rest of the contents. This document teaches a precise method for computing the time delay enabling the retrieval of the exact instant of the content at the instant of the interruption.

There is therefore a real need for a method to easily retrieve at least parts of the content that are broadcast in a radio stream and have not yet been played back in a receiver.

The invention also proposes a technical method and an architecture that are applicable to the implementing of all cases of the use of "stop and restart" and are usable by the makers of content receivers and by the producers of contents broadcast on a radio stream in the form of an access to a service platform dedicated and operated in the world-wide web.

3. SUMMARY OF THE INVENTION

One particular embodiment of the invention proposes a method of transmission of an audio and/or audiovisual content to a receiver device. The method comprise at least the following steps:

a step of reception of a determined stream broadcast on a network and of playback of the contents transmitted by said stream in the receiver device, a step of detection of a first event external to the receiver device triggering the interruption of the playback of the content in progress and of recording the instant of the interruption, a subsequent step of detection of a second external event triggering a step of transmission, from the receiver device to a remote server, of the instant dating the first event and a request for resuming the playback of the interrupted content, a step of transmission from the remote server to the receiver device of a piece of information specifying the identifiers of the data packets of the content at the instant of the interruption, a step of transmission of the data packets of the content thus identified, and of reception by the receiver of said data packets with a view to their time-shifted playback.

Thus, the proposed solution relies on an entirely novel and inventive approach making it possible to precisely determine the missing part of a content, the playback of which has started and has been interrupted, and making it possible to request a remote site to transmit this missing part in order to continue the time-shifted playback.

According to a preferred embodiment, the information transmitted by the dating server to the receiver comprises a manifest identifying a succession of chunks, the first chunk of which contains the data packets of the content at the instant of the interruption. In this way, the audio data to be transmitted from the server to the receiver are perfectly updated and identified.

According to another embodiment, the transmitted manifest identifies all the chunks available in the server containing the audio content broadcast between the instant of interruption and the present instant.

According to another embodiment, the transmitted manifest identifies all the chunks stored in the server from the instant at which the time interval between the instant of interruption and the present instant surpasses the duration of all the chunks stored in the server.

According to another embodiment, the information transmitted by the remote server to the receiver comprises a read address in a circular buffer of another remote server, this address corresponding to the first audio frame of the remaining part of the played content, the server thereafter transmitting the audio frames of the remaining part of the unplayed content. In this way, the audio data of the part of the content remaining to be played back are perfectly identifiable and can be transmitted more easily.

According to another embodiment of the invention, the method comprises a step for determining the current time at the instant of transmission from the receiver to the remote server at the instant dating the first event, and a step for computing the time offset between said received current time and the current time of the server, the data packets of the content at the instant of the interruption being dated by the transmitted time, from which the computed time offset is deducted. In this way, the instant of resumption is perfectly synchronized with the instant of interruption, and the user is assured that he has missed nothing and will not hear anything twice.

According to another embodiment, the method comprises a step for modifying the user interface for a limited duration specifying that the service for interrupting the playback of the content and for resuming time-shifted transmission is not available during this limited duration. In this way, the user can immediately see whether or not the service for resuming is available.

According to another aspect of the invention, a hybrid receiver is proposed for the playback of an audio content coming from a determined stream broadcast on a first network, said receiver comprising a means of reception of the determined stream broadcast on said first network, a communications means for communications with a remote server and a means of playback of this audio content with a view to time-shifted playback. The receiver further comprises:

a first means of detection of a first event external to the receiver triggering the interruption of the playback of the content in progress and the recording of at least the instant of the interruption given by an internal clock, a second means of detection of a second external event for the resumption of the reception of said content triggering the transmission to a remote server of the instant dating the first event and a request to receive the data packets of content broadcast from said instant onwards, the communications means receiving the data packets thus identified and intended for time-shifted playback.

According to another aspect of the invention, a system is proposed for the playback of an audio content comprising a hybrid receiver provided with a means of reception of said audio content coming from a determined stream broadcast on a network and a means of playback of this audio content with a view to a time-shifted playback. The system further comprises a first means of detection of a first event external to the receiver triggering the interruption of the playback of content in progress and the recording of the instant of interruption and a second means for detecting a second external event triggering the transmission, from the receiver to a remote server, of the instant dating the first event and a request for resuming the playback of the interrupted content, the system comprising a server receiving, from the receiver, a piece of information specifying the identifiers of the data packets of the content at the instant of the interruption and sending the receiver data packets thus identified, intended for time-shifted playback, to the receiver.

Another embodiment of the invention proposes a computer program product comprising program code instructions for the implementing of the method described in the above paragraphs, by means of the receiver device, when said program is executed on a computer.

4. LIST OF FIGURES

Figure 2:
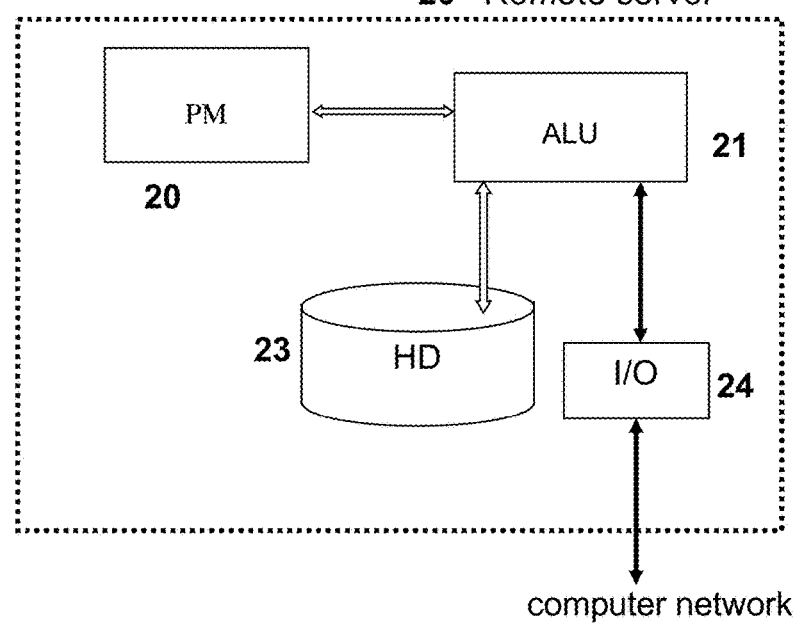
Figure 3:
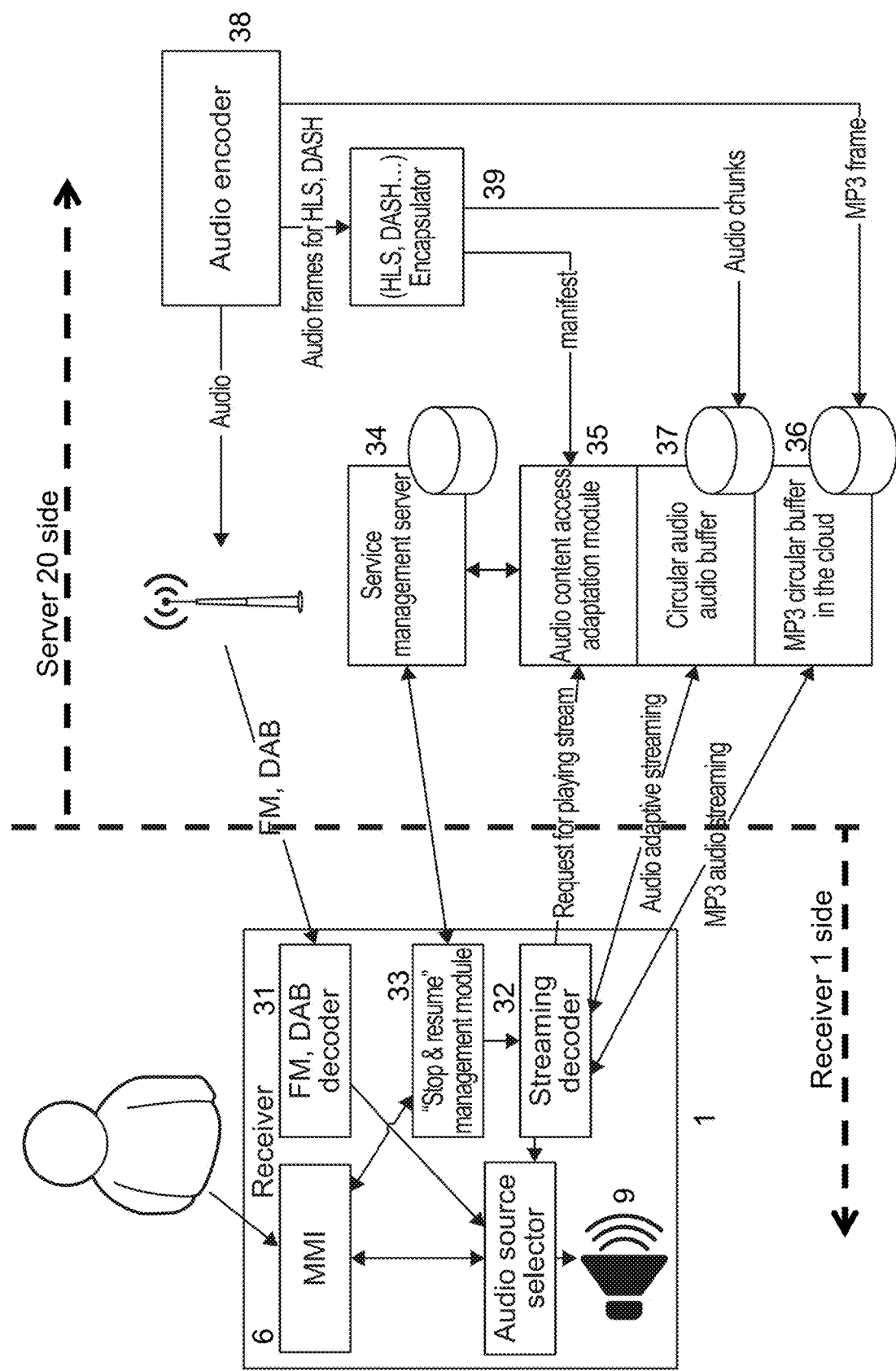
Figure 4:
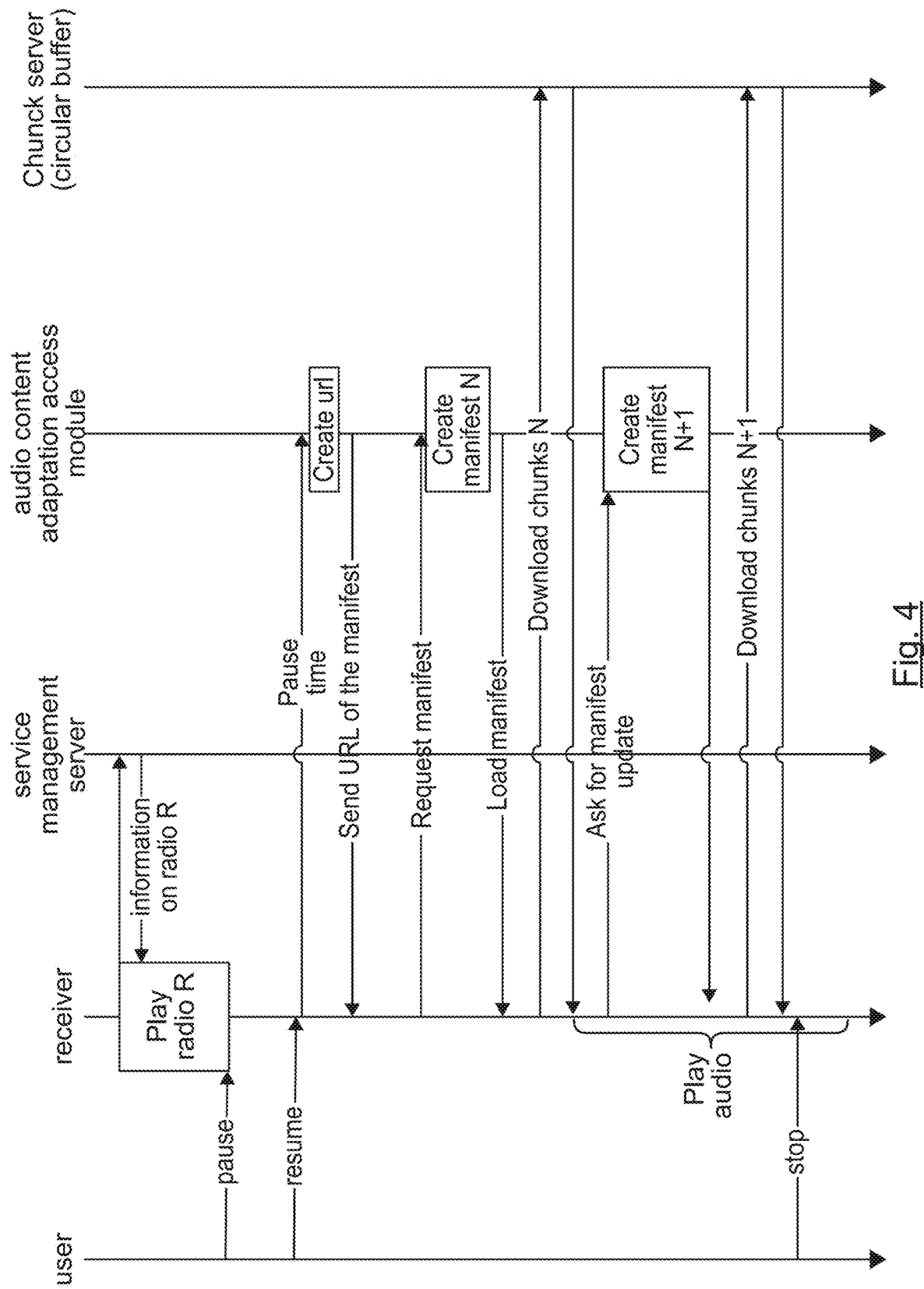
Figures 5, 7:
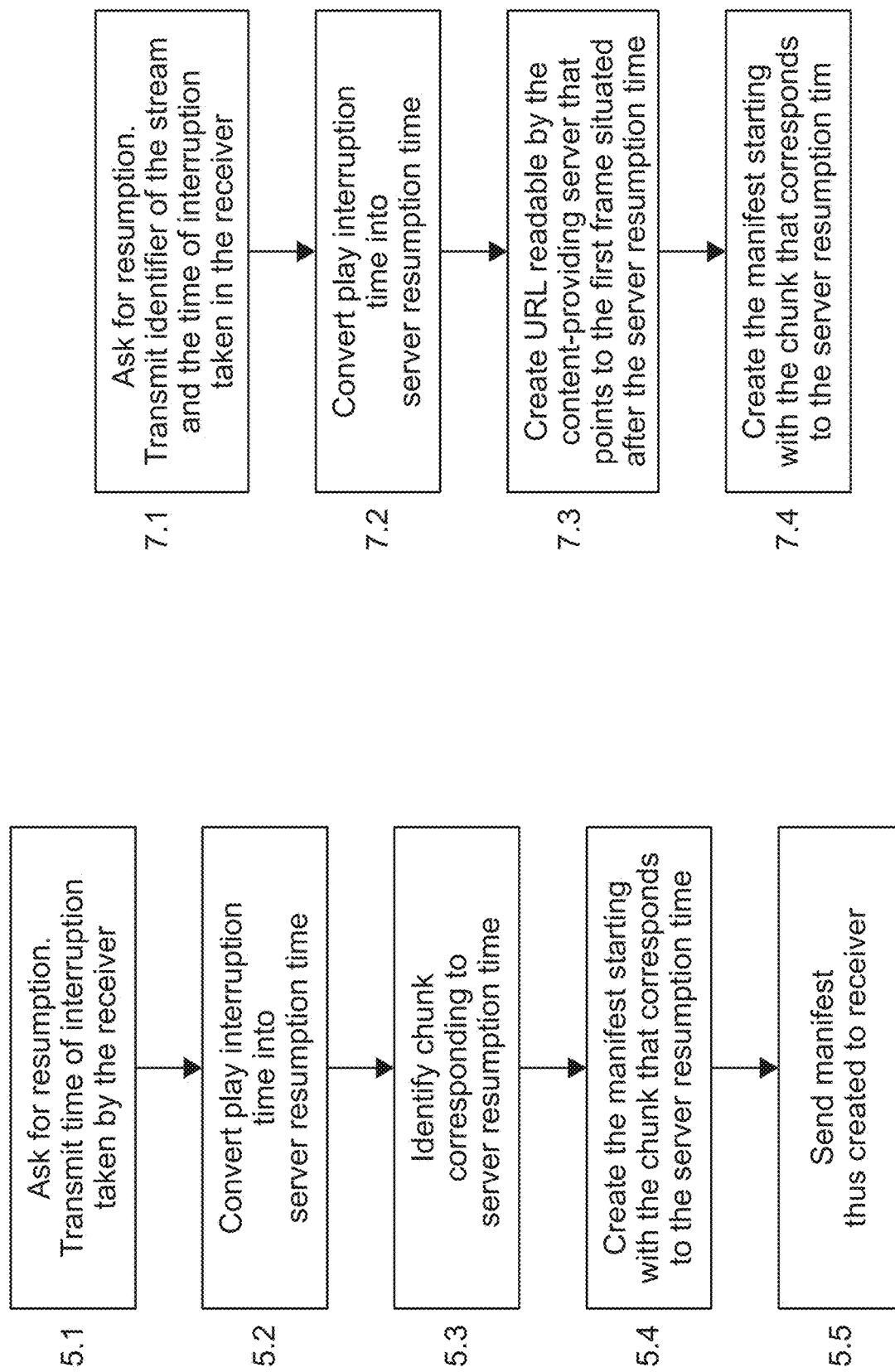
Figure 6:
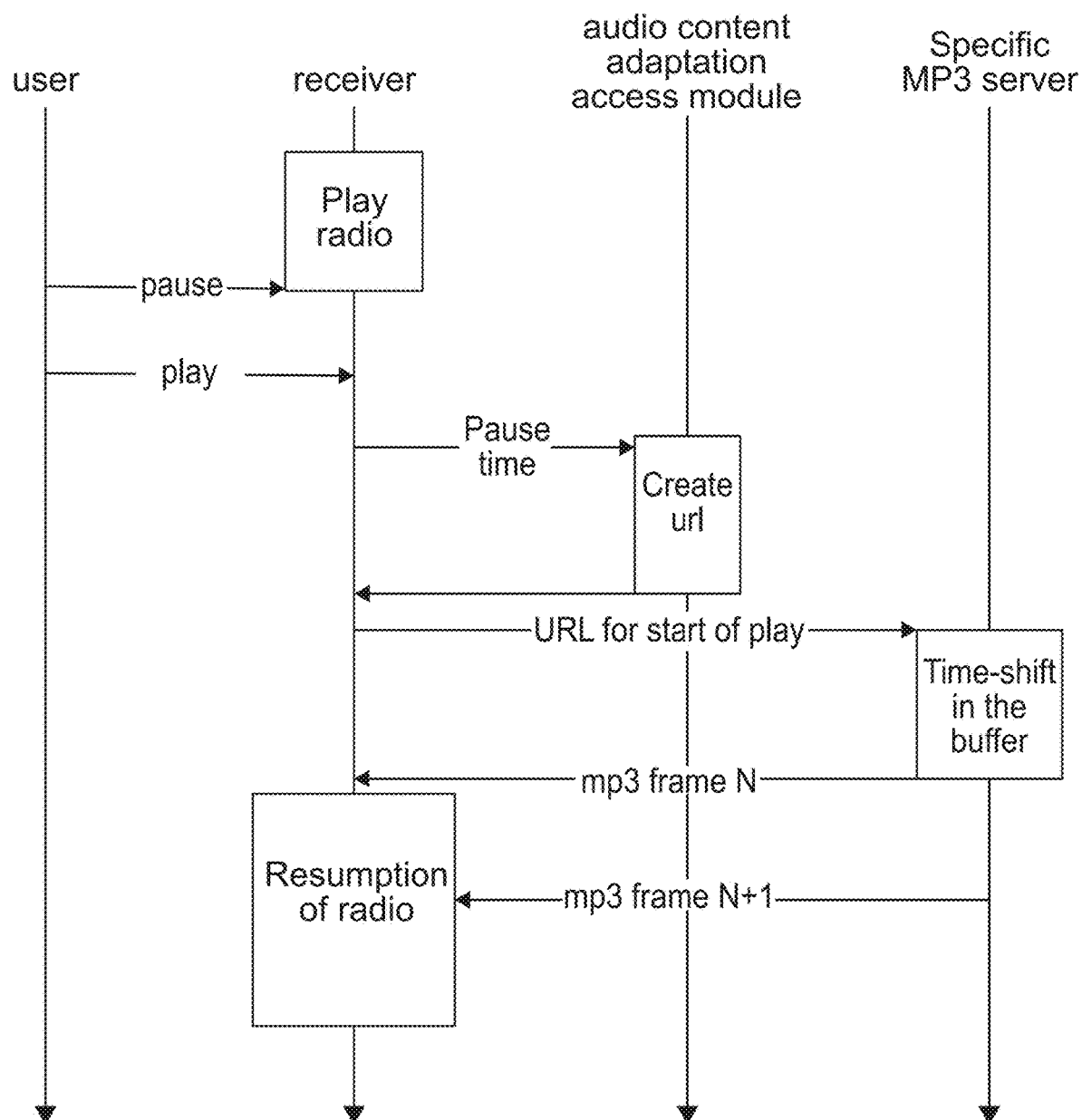

Other features and advantages of the invention shall appear from the following description, given by way of an indicatory and non-exhaustive example, and from the appended figures of which:

FIG. 1 presents the structure of a receiver according to one particular embodiment of the invention;

FIG. 2 illustrates the main components of a remote server, according to one example of an embodiment;

FIG. 3 presents a general architecture of the elements put into communication to provide a service for the time-shifted retrieval of contents according to a preferred embodiment of the invention;

FIG. 4 presents a timing diagram of the different communications coming into play between the elements of the system, according to one embodiment;

FIG. 5 presents a flow chart of the steps enabling the conversion of the time of the receiver into a time of resumption by the server according to an example of an embodiment;

FIG. 6 presents a timing diagram of the communications that take place between the elements of the system in the case of downloads of content files;

FIG. 7 presents a flow chart of the steps enabling the conversion of the time of the receiver into a time of resumption by the server in the case of downloads of contents files.

5. DETAILED DESCRIPTION

5.1 General Principle

The invention relates to a method for resuming the playback of an audio and/or audio-visual content in a receiver device. The method starts with a step for receiving the determined stream broadcast on a network and playing back the contents transmitted by said stream in the receiver device, and then a first event external to the receiver device is detected, triggering the interruption of the playback of the content in progress and the recording of the instant of interruption. Sometime later, a second external event triggers the transmission, from the receiver device to a remote server, of the instant dating the first event and a request for resumption of playback of the interrupted content. A piece of information specifying the identifiers of the data packets of the content at the instant of the interruption is then transmitted from the remote server to the receiver device. Finally, the device receives the data packets thus identified and plays back the content of said packets.

Thus, the proposed solution relies on an entirely novel and inventive approach enabling the easy retrieval from a remote server of the parts of a broadcast content that have not been played back in a receiver.

5.2 Description of One Particular Embodiment

In all the figures of the present document, the identical elements (or steps) are designated by a same numerical reference.

Referring now to FIG. 1, we present a structure of a hybrid receiver device 1 according to one particular embodiment of the invention. The hybrid receiver 1 typically comprises a central processing unit 2 associated with a program memory 3, a radio stream reception module 4 receiving broadcasts from a one-way network, an FM network for example, and a communications module 5 permitting short-range or long-range two-way radio communications by cable or radio using for example the Bluetooth, Wi-Fi and/or GSM network. The receiver also has means 6 for the introduction of commands (keypad, buttons, touchpad screen, etc.) and display means (screen, light-emitting diodes, voice synthesis means, etc.). These means can be integrated into the device or be remote devices. The device also has means for playing back an audio and/or audiovisual content, means composed for example of a remote screen 7 and/or an amplifier 8 integrated into the device sending signals towards remote speakers 9. The device has input/output means 10 used to send out and receive signals to and from any device with which it is connected. It can receive signals coming from sensors, a microphone for example.

According to one non-obligatory improvement, the hybrid receiver also has a memory 11 capable of storing an audio content and/or audiovisual content broadcast by a one-way or two-way network.

The hybrid receiver receives an electrical power supply or has its own battery. It can be mobile and take the form of a smartphone. It can for example be embedded in a roaming vehicle.

FIG. 2 illustrates the main components of a remote server 20. According to this embodiment, the server 20 comprises a central processing unit ALU 21 connected to an executable program memory PM 22, a hard disk drive HD 23 containing a database for the non-volatile storage of data. The server 6 also contains an interface I/O 24 for communications with the receiver 1 via a computer network. The server 6 enables the management of the content resumption service. The same server or another server can transmit, at request from a receiver 1, the chunks of a content transmitted in adaptive streaming mode or MP3-format data blocks of a content to be downloaded. It is thus not ruled out that the linking means may differ according to the type of device in communication. Thus, the server 20 can communicate with the receivers 1 through a wireless network (3G/4G mobile telephony) and/or by a cable via any unspecified digital network.

FIG. 3 presents a general architecture of the elements put into communication to provide a service known as a "Stop and Resume" or S&R service which enables the time-shifted resumption of a content. As is shown by the two parts separated by a vertical line in the figure, these elements are situated either in the receiver or in the different services accessible by the network.

The S&R system that makes it possible to manage the stopping of the playback of a content and its time-shifted resumption relies on different devices and different software modules. The S&R system fulfils the following functions:

It makes sure that the S&R service is available for the interrupted content with a server dedicated to the service management.

It analyzes whether the service is still available for the program that was played during the last interruption.

It informs the MMI of the receiver of this availability to adapt the display in order to inform the user thereof and enable him to resume the interrupted content.

At the user's request, it relaunches the playback of a content that is still available. To this end, it asks the audio service access adaptation module for the URL that is to be used to resume the playing of the content.

It gives this URL to the streaming decoder so that the receiver can resume playing the content at the place where it was interrupted.

It may be recalled that URL is an acronym meaning Uniform Resource Locator.

The receiver 1 possesses an MMI 6 enabling its user to choose a content, stop it at any time and request its resumption at this user's request or automatically if the cause of the interruption is external to the user (phone call, stopping of the receiver etc.). The MMI 6 displays the availability or non-availability of the S&R service in the form of an icon present on the screen. This icon is for example represented by a drawing "STOP" thereby indicating that the content can be interrupted at any instant. The absence of this icon indicates that this function is not available, and this may be due for example to a break in communications with the server managing the S&R service or due to a saturated data memory that allows no recording. When the content has been interrupted, the S&R service is then accessible by an icon which illustrates the "Resumption" function. The absence of such an icon also means that the service is no longer available. Should the access to the service be done by a mechanical key, then the service accessibility indicator can be represented by an indicator light at the side of this touchkey.

The receiver also possesses the following software modules:

Audio source selection module 30: it receives the audio sources available on the receiver and selects the audio content to be played back. This module is controlled by the user via the MMI.

FM, DAB decoding module 31: it decodes the selected service in FM and/or DAB reception and outputs the decoded audio samples to the audio source selection module.

Stream decoder 32: it gets connected to the streaming server via a URL address given by the service server S&R, decodes the audio and/or video data and gives them to the audio source selection module. This module can be compatible with one or more streaming protocols such as DASH, HLS or MP3 streaming.

S&R management module 33: it receives commands from the user introduced into the MMI and commands the streaming decoder.

On the network side, the S&R services rely on the following different servers, which can be hosted by the same computer hardware:

Service management server 34: it informs the terminals about the availability of the S&R service. The receiver 1 sends out a request in providing the ID of the program being listened to. The server for its part returns the following data:
- the depth or duration, in terms of seconds, of the circular buffer available on the server side for the service considered,
- the list of the streaming protocols available to resume the playing of the content,
- the URL address of the content access adaptation module.

Content access adaptation module 35: it builds the address of the URL that is transmitted to the receiver 1 to resume the playing of the content. To this end, it awaits the following elements in the receiver's request:
- the streaming protocol requested by the receiver: MP3 streaming, HLS, DASH etc.
- the current time of the receiver when the request is sent: this time is used to compute the time offset between the server and the receiver,
- the time at which the playing must be resumed.
- the identification of the source transmitting the content, the playing of which must be resumed.

If for example the receiver asks for an MP3 streaming URL: the server returns a URL containing an identifier of the position at which the streaming must be started. This identifier can be the server time at which playing is to be resumed.

If for example the receiver asks for an adaptive streaming URL (HLS, DASH etc.): the server dynamically computes and then sends back to the player, for example an MPD file (for DASH) or an M3U file (for HLS) that is proper to the receiver that has made the request. This file contains, as a first reference, the reference of the first frame to be played to resume the audio content at the requested position. The receiver plays the file cyclically, and the server then updates it dynamically in order to carry out the downloading of the following chunks by the receiver.

MP3 circular audio buffer 36 in the cloud: the URL used by the player on the receiver side contains an identifier of the position at which the streaming must be started. This identifier can be the server time at which the play is to be resumed. This identifier is interpreted by the server which is positioned in the list of the frames that it contains in its circular buffer. If the identifier is the server time, the server uses the time of the last frame added to the buffer to compute the shift to be made to get positioned on the right frame to start the streaming. The streaming is then seen by the receiver as live streaming and continues until the user chooses to exit the resume mode.

Circular audio buffer 37 of chunks (DASH, HLS etc.): the chunks are made available to the receivers on an http server in the form of files. Each chunk is present only once on the server and is shared by all the receivers. The server gradually erases the chunks that go out of the time interval covered by the "resume" function so as not to saturate the storage space.

Audio encoder 38: it creates MP3 audio frames or AAC audio frames in using the same audio source as the one broadcast in DAB and FM, if the content is of the audio type.

Encapsulator 39: in the case of adaptive streaming for an audio content, the frames are then packaged in the form of chunks and deposited on a server.

The invention can be used in at least two content transmission systems, the first relates to documents transmitted by adaptive streaming according to standards such as DASH (dynamic adaptive streaming over http) or HLS (http live streaming), and the second relates to documents downloaded according to an MP3 standard for example. These standards have been developed by major American computer firms.

In general, the adaptive streaming protocols cited here above are massively used today, and there is no reason to spell hem out in greater detail in this document. Adaptive streaming enables the transmission of one or more description files (called "manifests" in certain standards) and a set of files containing the content to be broadcast (or a file in the case of MP3).

The invention shall now be explained with respect to these communications exchanges for each of these systems.

5.3 Particular Embodiment in the Context of Adaptive Streaming

FIG. 4 illustrates the following in the form of a timing diagram where the time evolves from top to bottom, different communications taking place between:
- the user and his receiver,
- the S&R service management server,
- the audio content access adaption server,
- the content-providing (i.e. chunk-providing) server.

This figure illustrates a resumption of the playback of an audio content, but the invention also relates to contents having a video component. In a first stage, the user launches the playback of a content transmitted by a radio stream from his receiver 1. An event takes place that interrupts the playback. This event is for example an action by the user to stop the playback, the taking of a phone call that will use the audio system 8, 9 of the receiver, the detection of a power supply fault leading to the immediate stoppage of the receiver, etc. At the instant of the interruption, the receiver 1 stores the precise instant of the interruption in its non-volatile memory. A little later, the user introduces a new command "Resume" to resume playback, and the receiver then transmits a request containing the precise instant of the interruption of this content to the audio content access adaption server. The server then sends back an URL enabling a receiver to receive a manifest. A manifest is a file describing the set of contents available according to a certain standard, DASH for example, and especially the way to find the streams that provide these contents. The receiver then sends a request to receive this manifest, and the audio content access adaption server transmits it. This manifest contains the references of the chunks of the content part remaining to be played back. The receiver then transmits these references to the content-providing server which sends back the chunks containing the data to be played back. The receiver can then start resuming the playback of the interrupted content. The implementation in the case of adaptive streaming takes account of the fact that the chunks are independent entities and that it is enough to ask for them in order to receive them.

The receiver then regularly updates the manifest with the audio content access adaption server so as to receive the chunks that follow the part of the content currently being played back. According to one particular embodiment, the receiver asks for a new version of a manifest when the duration of playback that it has at its disposal is below a threshold, less than one minute for example.

According to another aspect of the invention, each receiver has available its own means to time-stamp the instant of the interruption and this time can therefore change from one receiver to another. It is therefore important for the server to precisely determine the instant at which the interruption has truly taken place on each receiver so that the play starts at the right place. FIG. 5 presents a flow chart of the steps enabling the time of the receiver to be converted into server resumption time according to one example of an embodiment. At the step 5.1, the receiver receives a resumption request from the user and sends the audio content access adaption server the instant of the interruption taken by the receiver. The server then computes the difference between the current time of the receiver and the current time of the server and, in applying this difference, it converts the time of the receiver into a server resumption time (step 5.2). Let us assume for example that the time of the receiver is 02.02 hours (2.02 am) while at the same time, the server time is 02.00 hours (2 am). At the instant that the receiver sends its request, it transmits its current time, 02.02 hours, to the server. The server take its current time and computes the difference: +2 min. The clock of the receiver is therefore ahead by 2 minutes. Let us assume that the receiver thereafter wishes to resume the playback of a content that it had interrupted at 11.00 hours (i.e. 11 am in its own time). Then the server deducts 2 minutes and, at the step 5.3, identifies the chunk that corresponds to the time of resumption of the server. The content access adaption server then creates a manifest, the first chunk of which corresponds to the time of resumption of the server (step 5.4). At the step 5.5, this manifest is transmitted to the receiver. Thus, the adaptation server gives the first URL of the MPD/playlist to the receiver so that it can start playing. This URL possesses a particular structure. The first part comprises the path so that the requests for updating the manifest reach the adaptation module. The second contains the identifier of the radio to be replayed and the server time corresponding to the start of play from the buffer. This time can be set in the name of the manifest or in the path enabling access to the manifest. The structure enables the processing of the updating requests for updating the manifest without having to maintain a session between the receiver and an adaptation module in particular. This facilitates the scalability of the platform and the management of the load balancing.

The second part corresponds to the playing of the stream. It can be summarized in the form of a loop in which the receiver asks for a new manifest and the audio content access adaption server creates these new manifests in adding the new chunks available and in eliminating those erased in the memory. In this way, the server updates the content of each manifest as a function of the available chunks. For example, if the receiver asks for resumption ten minutes after the interruption of the playback, the next manifest will contain the list of chunks corresponding to these ten minutes. Let us assume that the receiver asks for a manifest every 20 seconds for example, at the second request the manifest transmitted by the receiver contains references for playing 10 minutes and 20 seconds. Then, at the third request, it contains references for 10 minutes and 40 seconds, etc.

It must be noted that the adaption server possesses a different implementation for each type of adaptive streaming: DASH, HLS, HSS etc. The server dynamically generates the manifests in order to remain compatible with the specifications of each protocol.

5.4 Particular Embodiment in the Context of Downloading

FIG. 4 illustrates, in the form of a timing diagram in which the time progresses from top to bottom, different communications that come into play between:
- the user and his receiver,
- the S&R service management server,
- the server providing the content in the form of MP3 files for example.

Unlike the system providing chunks, which requires the creation of manifests, the files are directly identifiable without needing a manifest. The file or files forming the content are then managed circularly by a read pointer and a write pointer. It must be noted that the MP3 content is managed in the form of a buffer in memory which is seen as a single file/stream by the receiver. In this case, the server can associate each transmitted frame with the sending time and when it is asked to transmit frames from a certain time onwards, it can determine which frames are being referred to. The receiver 1 receives a set of frames and gets synchronized with the frame for which the playback has been interrupted or the entire frame that follows the instant of the interruption In a first stage, the user launches the playback of a content transmitted by a radio stream from its receiver 1. An event takes place that interrupts the playback and triggers, in the receiver, the storage of the precise instant of the interruption. A little later, the user introduces a new "Play" command to resume the playback, and the receiver then sends a request containing the precise instant of the interruption of this content to the audio content access adaptation server. The server then computes the URL that enables pointing, in the circular buffer, to the data frame of the content that follows the instant of the interruption and sends this URL to the receiver. This receiver then asks the server providing the content to send it back the frame identified by the URL transmitted (for example MP3). The server transmits the frame to the receiver and offsets the read pointer.

After the first files have been received, they are decoded and their audio and/or visual contents are played back in the receiver. The receiver regularly makes requests to download the following files, so as to continually pursue the playback. A new request is transmitted to the content-providing server when the duration of the files that have been received but have not yet been played back is below a threshold, for example a threshold of one minute.

According to one alternative embodiment, the transmitted manifests describe the files of the content broadcast between the instant of the resumption and the present instant, within the limit of the files available in the circular memory on the server side. This variant enables the user of the receiver to do fast forward and fast return moves in playing back the audio content and especially to return to the playback of the currently broadcast content.

According to this variant, at the instant of resumption of the playback, the first manifest describes the list of all the files available from the instant of interruption until the present instant. In a second stage, the other manifests describe the files for which the audio content has been broadcast at the time of the resumption up to the present instant, until the maximum size of the circular memory of the server is attained. In this way, the user can navigate in the audio content that has been broadcast during the resumption of the playback and up to the present instant.

In a third stage, when the manifest describes all the files available in the server, it is necessary to move the first file described by the manifest forward in time. It is then no longer possible to return to the instant of resumption because the associated files are no longer available in the memory of the server. The manifest then describe a time slot that corresponds to the size of the circular buffer. This implies that the earliest time for the playback indicated in the manifest request becomes the earliest time in the circular buffer, and no longer that of the time-shifted playback on the receiver side. This explains why the receiver must know the duration of storage of the server.

Let us take an example: the circular memory possesses a storage capacity corresponding to two hours of playback of contents and the user asks for a resumption 1 hour, 30 minutes after the interruption. During the first 30 minutes that follow the resumption, the user can browse through the playback of the content and can resume playback up to the instant of the resumption. After this, the user browses in the content broadcast during the two hours preceding the current instant.

FIG. 7 presents a flow chart of the steps enabling the conversion of the time of receiver into the server's resumption time according to an example of an embodiment. At the step 7.1, the receiver receives a resumption request from the user and sends the audio content access adaptation server the instant of the interruption taken at the receiver (with its clock for example). The server then computes the difference between the current time of the receiver and the current time of the server and, by applying this difference, it converts the time of the receiver into a server resumption time (step 7.2). Just as above, the server deducts the difference measured from the time transmitted by the receiver. The content access adaptation server then creates a URL which points to a first file containing audio and/or video data corresponding to the resumption time of the server (step 7.3) and sends this URL to the receiver. At the step 7.4, the receiver the URL to the content server in order to download the files, the data of which have to be played back.

In the same way, the first frames of the content which are transmitted are truly those that correspond to the remaining part to be played back.

The contents transmitted by an FM channel do not comprise any time indications. Certain streams transmit data of this type. According to an improvement and in this case, for example according to the MPEG TS standard, the invention uses an internal clock. The S&R module recorded in the receiver then takes account of the clock values transmitted and determines the values, and the web server has access to the values of the clock used during the broadcast.

In this way, the receiver can compute its own time offset relative to the clock of the broadcasting network. This time offset is constant over time so that the receiver can transmit it, during an interruption followed by a resumption, to receive the right files.

According to one improvement, the receiver receives an indication on the duration of playback of the content recorded in the circularly managed memory. In this case, the receiver can subtract the size of the memory at its current time to determine the position of the pointer. If the resulting time is prior to the time of stoppage of listening, then it is possible to propose the S&R function to the user. If not it is not possible. This analysis must be done cyclically every one second for example in order to stop proposing this function to the user as soon as resumption time comes out of the range of time covered by the circular memory.

The resumption of playing from the circular memory can take a little time. This time lag is variable and is highly dependent on the network bit rate available for the receiver. There is therefore a risk for the user that he will request the resumption of play and that the content will no longer be available at the instant when the streaming server receives the request. In order to avoid this dysfunctioning and according to another improvement, the receiver can eliminate access to the S&R function, one minute for example before the real end of availability of this service.

5.5 Particular Embodiment in the Case of a Segmented Content

This embodiment concerns the fact that the content is segmented with a semantic unit. This is the case for example of the structure of broadcasting by radio stations or television channels which is organized according to program schedules. Each element of the program schedule corresponds to a show that is indicated by a title, a date and scheduled starting and ending times for the broadcast. Each show corresponds to a segment or a chunk and the comparison of the play time of the receiver with the information for identifying the times of the shows identifies the segment that is being listened to and makes it possible to propose to the listener that he shift the playing position on the streaming flow to the beginning of the localized segment to resume listening at the start of the show in progress. For this embodiment, the information on identifying shows and their times are obtained from information on planned programs published by the radio or television program producers, either on their Internet sites or on servers for professional use which are given more precise information.

This is also the case for example with a radio show interspersed with advertising sequences, for example a cultural show during which questions are asked and answers are provided and commented upon. The broadcaster incorporates an advertising sequence at the end of the responses to a question and just before the next question is asked. Each segment truly comprises a semantic unit forming an agglomeration of at least one question raised and its associated response. In another example, a radio newscast, composed of several reports, each report processing a particular subject, constitutes a segment of said newscast in itself.

According to a preferred embodiment, the broadcaster of the content determines the start of each segment of a same content. This marking can be done by an operator. According to one alternative embodiment, the receiver has a content analysis means to carry out the segmentation. According to this variant, the receiver finds the advertising sequences by using the presence of advertising jingles marking the start and end of the sequence or the increase in sound level that very generally signals the presence of an advertising sequence.

In the context of the broadcasting of a segmented content, when the second event takes place (step 7.1) the receiver gives the user the choice of introducing one or another of the following commands:
resumption of the content at the precise instant of the interruption, resumption of the content at the start of the segment, the playback of which has been interrupted.

The latter choice enables a user to return and re-listen to the start of the segment to better remember the instant of the interruption.

The choice is presented preferably in the form of distinct buttons to be pressed on the keypad of the receiver or two distinct icons in the case of a touchpad screen. If the user asks to resume the playback of the content at the precise instant of the interruption, then we are in the case described here above in the present document. For example, the receiver searches in its non-volatile memory for the precise instant of the interruption and asks a remote server to send back a manifest in using this instant.

Should the user ask to resume the content at the start of the segment for which the playback has been interrupted, then the receiver searches for the start of the segment. In this case, the receiver will play back the content. According to a preferred embodiment, the receiver asks the remote server to send it a manifest that contains references of chunks of the segment to be played back that contain the instant of the interruption. For example, if each segment of a one-hour show lasts 10 minutes and if the instant of the interruption has taken place 15 minutes from the start, the remote server sends back the receiver a manifest that contains the references of the chunks of the second segment, i.e. the one that starts 10 minutes after the start of this show.

According to the variant in which the receiver has means to retrieve the start of each segment, this receiver sends the server the instant of the start of the interrupted segment. The server then in response transmits a manifest which contains the references of the chunks that are situated at the start of this segment.

It must be clear to those skilled in the art that the present invention enables embodiments in many other specific forms without departing from the field of application of the invention as claimed. The present embodiments should therefore be considered as illustrations which however can be modified in the field defined by the scope of the appended claims.

The invention claimed is:

1. A method of transmission of an interrupted audio content in a hybrid receiver with a view to a time-shifted playback, the method comprising at least:
   receiving a determined stream broadcast on a network and playing back contents transmitted by said stream in the receiver,
   detecting a first event external to the receiver, triggering interruption of the playing back of the contents in progress and recording an instant of the interruption,
   a subsequent detecting of a second external event triggering transmission, from the receiver device to a remote server, of the instant of the interruption and a request for resuming the playing back of the interrupted content,
   transmitting, from the remote server to the receiver device, a piece of information specifying identifiers of data packets of the content at the instant of the interruption, said information comprising a manifest identifying a succession of data packets, including those of the audio content broadcast between the instant of the interruption and the present instant, and
   transmitting the data packets, thus identified, of the content, and receiving by the receiver said data packets with a view to their time-shifted playback.

2. The method according to claim 1, wherein the transmitted manifest identifies all chunks stored in the remote server, starting from the instant when a time interval between the instant of interruption and the present instant surpasses a duration of all the chunks stored in the server.

3. The method according to claim 1, wherein the information transmitted by the remote server to the receiver comprises a read address in a circular buffer of another remote server, this address corresponding to a first audio frame of an unplayed remaining part of the audio content, the server thereafter transmitting audio frames of the unplayed remaining part of the content.

4. The method according to claim 1, wherein said audio content is divided into a plurality of segments, each presenting a semantic unit, and the detection of the second event triggers determining an instant of a start of the segment, the playback of which has been interrupted by the first event during the broadcasting of the content, the remote server transmitting, to the receiver, the manifest identifying the succession of data packets including those of the start of the interrupted segment.

5. The method according to claim 4, wherein the determining the instant of the start of the segment, the playback of which has been interrupted by the first event, is carried out at the remote server.

6. The method according to claim 4, wherein the determining the instant of the start of the segment, the playback of which has been interrupted by the first event, is carried out at the receiver which transmits this instant to the remote server.

7. The method according to claim 4, wherein the detection of the second external event triggers proposing to a user that the user choose between a playback of the content at the precise instant of the interruption during the broadcasting of the content, or at the start of the segment, the playback of which has been interrupted.

8. The method according to claim 1, further comprising determining a current time of the receiver at the instant of transmission, from the receiver to the remote server, of the instant dating the first event and computing a time offset between the current time of the receiver and a current time of the server, the data packets of the content at the instant of the interruption being dated by instant of the interruption, from which the computed time offset is deducted.

9. The method according to claim 1, further comprising modifying a user interface for a limited duration, specifying that a service for interrupting the playback of the content and for resumption with time-shifted transmission is not available during this limited duration.

10. The method according to claim 1, wherein the audio content, interrupted and then resumed with a time shift, is received in the hybrid receiver in a format according to one of the standards from the following list: MPEG, HLS or DASH.

11. The method according to claim 1, wherein the audio content is read at the server from a circularly managed memory.

12. A hybrid receiver for playback of an audio content coming from a determined stream broadcast on a first network, said receiver comprising:
   a processor; and
   a non-transitory computer-readable medium comprising instructions stored thereon which when executed by the processor configure the hybrid receiver to:
   receive the determined stream broadcast on said first network;
   detecting a first event external to the receiver triggering interruption of a playback of the content in progress and recording at least an instant of the interruption given by an internal clock, detecting a second external event for resumption of the reception of said content triggering a transmission, to a remote server, of the instant dating the first event and of a request to receive data packets of content broadcast from said instant onwards;

receiving, from said remote server, a piece of information comprising a manifest identifying a succession of data packets including those of the audio content broadcast between the instant of the interruption and a present instant, the data packets thus identified being intended for reception and time-shifted playback.

13. A system for playback of an audio content, the system comprising:
- a hybrid receiver provided configured to receive said audio content coming from a determined stream broadcast on a network and a a playback device to playback the audio content;
- a first means for detecting a first event external to the receiver triggering interruption of the playback of the content in progress and recording of an instant of interruption and a second means of detection of a second external event triggering transmission, from the receiver to a remote server, of the instant dating the first event and of a request for resuming the playback of the interrupted content; and
- the remote server which is configured to receive, from the receiver, a piece of information specifying identifiers of data packets of the content at the instant of the interruption and sending the receiver a piece of information comprising a manifest identifying a succession of data packets including those of the audio content broadcast between the instant of the interruption and a present instant, the data packets thus identified being intended for reception and time-shifted playback.

14. A non-transitory computer-readable medium comprising instructions stored thereon which when executed by a processor of a hybrid receiver configure the hybrid receiver to:
- receive a determined stream comprising audio content broadcast on a first network;
- playback the audio content;
- detecting a first event external to the receiver triggering interruption of the playback of the content in progress and recording at least an instant of the interruption given by an internal clock,
- detecting a second external event for resumption of the reception of said content triggering a transmission, to a remote server, of the instant dating the first event and of a request to receive data packets of content broadcast from said instant onwards; and
- receiving, from said remote server, a piece of information comprising a manifest identifying a succession of data packets including those of the audio content broadcast between the instant of the interruption and a present instant, the data packets thus identified being intended for reception and time-shifted playback.

* * * * *